(12) United States Patent
Garziera

(10) Patent No.: US 7,762,182 B2
(45) Date of Patent: Jul. 27, 2010

(54) TILTING HANDLE FOR PANS

(75) Inventor: Roberto Garziera, Appiano Gentile (IT)

(73) Assignee: Ballarini Paolo & Figli S.p.A., Mantovano (IT)

( * ) Notice: Subject to any disclaimer, the term of this patent is extended or adjusted under 35 U.S.C. 154(b) by 435 days.

(21) Appl. No.: 11/704,672

(22) Filed: Feb. 9, 2007

(65) Prior Publication Data
US 2007/0227366 A1 Oct. 4, 2007

(30) Foreign Application Priority Data
Feb. 10, 2006 (IT) .................. MI2006A-0233

(51) Int. Cl.
*A47J 37/10* (2006.01)
(52) U.S. Cl. .................. 99/425; 99/422; 99/418; 99/340; 99/444
(58) Field of Classification Search ........... 99/422–425, 99/403–418, 340, 444–450; 220/752–759, 220/768–770, 912; 16/110.1, 425, 111.1, 16/DIG. 24, DIG. 25
See application file for complete search history.

(56) References Cited

U.S. PATENT DOCUMENTS

| | | | | |
|---|---|---|---|---|
| 5,373,608 A | * | 12/1994 | Welch | 16/425 |
| 6,393,973 B1 | * | 5/2002 | Velo et al. | 99/422 |
| 6,694,868 B1 | * | 2/2004 | Hung | 99/403 |
| 6,848,355 B2 | * | 2/2005 | Cesare | 99/342 |
| 6,920,820 B2 | * | 7/2005 | Meggison et al. | 99/422 |

* cited by examiner

*Primary Examiner*—Thor S Campbell
(74) *Attorney, Agent, or Firm*—Kirschstein, et al.

(57) ABSTRACT

A tilting handle for pans is integral with a supporting extension, to which is rotatably coupled a projection rotatable about a horizontal axis, the two sides of the supporting extension and rotary projection including slots therein mutually facing swinging pins arranged along a cross axis of the handle are engaged, the handle including a swinging lever which may swing against an urging spring and comprises a detent tooth engageable with a detent step of the supporting extension.

8 Claims, 9 Drawing Sheets

TILTING HANDLE FOR PANS

BACKGROUND OF THE INVENTION

The present invention relates to a tilting handle for pans.

Cooking pans, including a food cooking pan recess, are already known in the prior art, and usually comprise a handle which projects radially outward from the wall of the pan.

This prior pan has the drawback that the radially projecting pan handle is a fixed one and, accordingly, for storing the pan as it is not used, for packaging it, for shipment purposes, for arranging it in a dish washing machine, a refrigerator, or in a kitchen furniture piece, a large space is required.

Cooking pans including a removable cooking pan handle are already known, thereby they can be stored in a very reduce space. However, since the detached pan handle can be loosened or not quickly recovered from kitchen drawers or the like, drawbacks frequently occur in using such a removable handle pan.

Cooking pans including a tilting handle which, from a radially projecting use position can be brought, for storing purposes, above the cooking recess of the pan are also known.

However, such a pan has the drawback that, in a non use position thereof, the handle projects upward from the pan recess, with the above disclosed storing drawbacks.

SUMMARY OF THE INVENTION

Accordingly, the aim of the present invention is to overcome the above mentioned drawbacks, by providing a cooking pan including a cooking pan handle which, in a use condition thereof, radially projects from the pan to allow the latter to be easily and safely gripped whilst, in a non use condition thereof, the handle can be brought to a folded or down-tilted condition adjoining the perimetrical wall of the cooking pan, to greatly reduce the pan size, both in a radial and in an axial direction.

The above aim is achieved by a tilting handle for a pan having a pan body and an extension projecting therefrom to receive a projection, the extension and projection having two sides including a plurality of slots, the slots of said extension being covered by a wall forming a chamber adapted to receive parallel arms projecting from the front side of the handle, from said arms extending mutually facing pins slidably engaged in said extension and projection slots, said projection being rotatably coupled to said extension, therewith/therefrom a detent tooth of a swinging lever designed for swinging about a cross pin mounted in the handle and being urged by an urging spring can be respectively engaged/disengaged.

BRIEF DESCRIPTION OF THE INVENTION

The subject matter according to the present invention will be disclosed in a more detailed manner hereinafter and shown with reference to an embodiment thereof which is illustrated, by way of an indicative example, in the accompanying drawings, where:

FIG. 1 schematically shows a portion of a cooking pan integral with a supporting element provided for receiving a cooking pan handle;

DESCRIPTION OF THE PREFERRED EMBODIMENT

Figure 1:
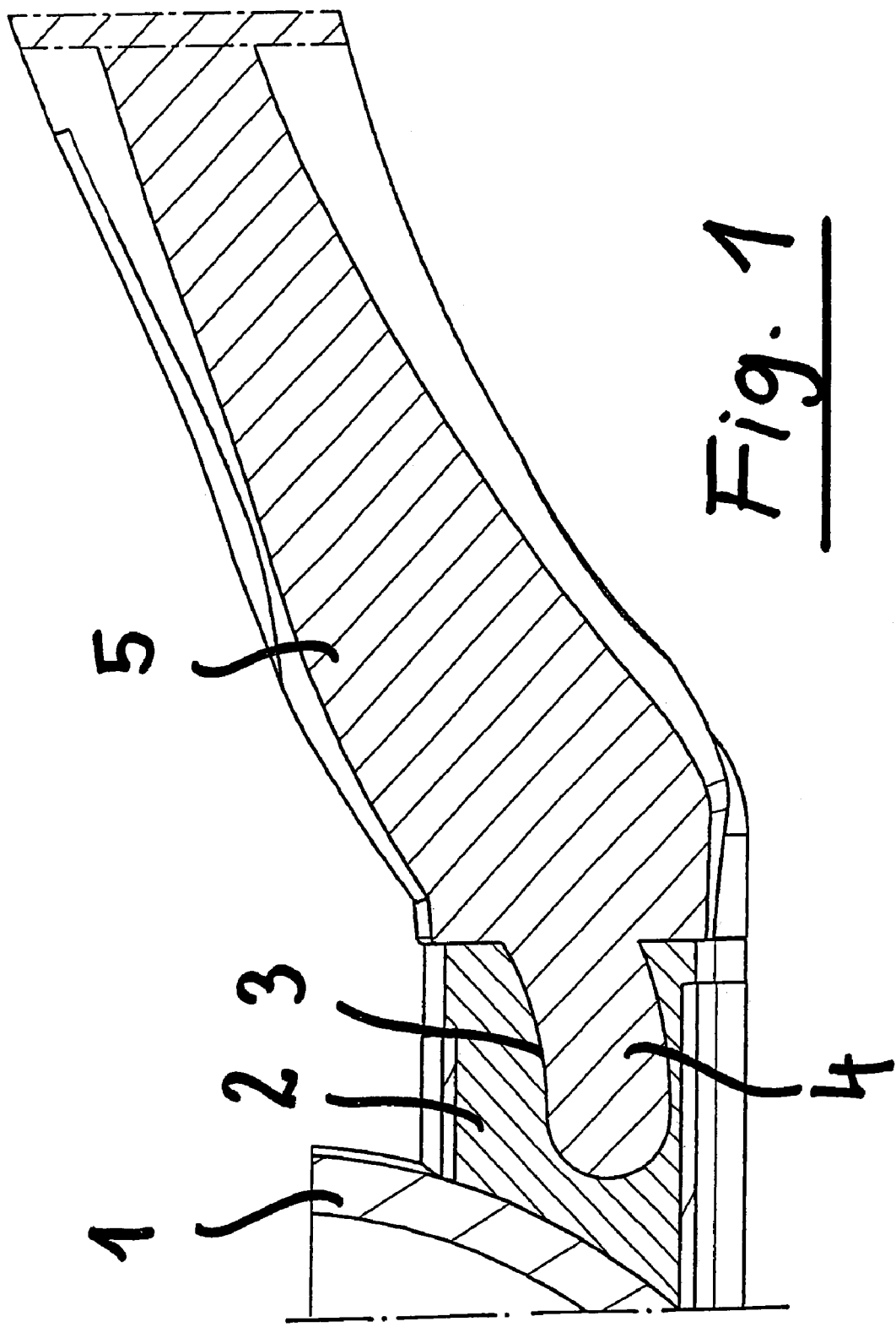

FIG. 1 shows in cross section a portion of the cooking pan 1 from which projects a supporting extension 2 including a plurality of parallel openings 3 for engaging therein corresponding projections 4 projecting from a handle 5.

This detail will be further disclosed hereinafter.

Figure 2:
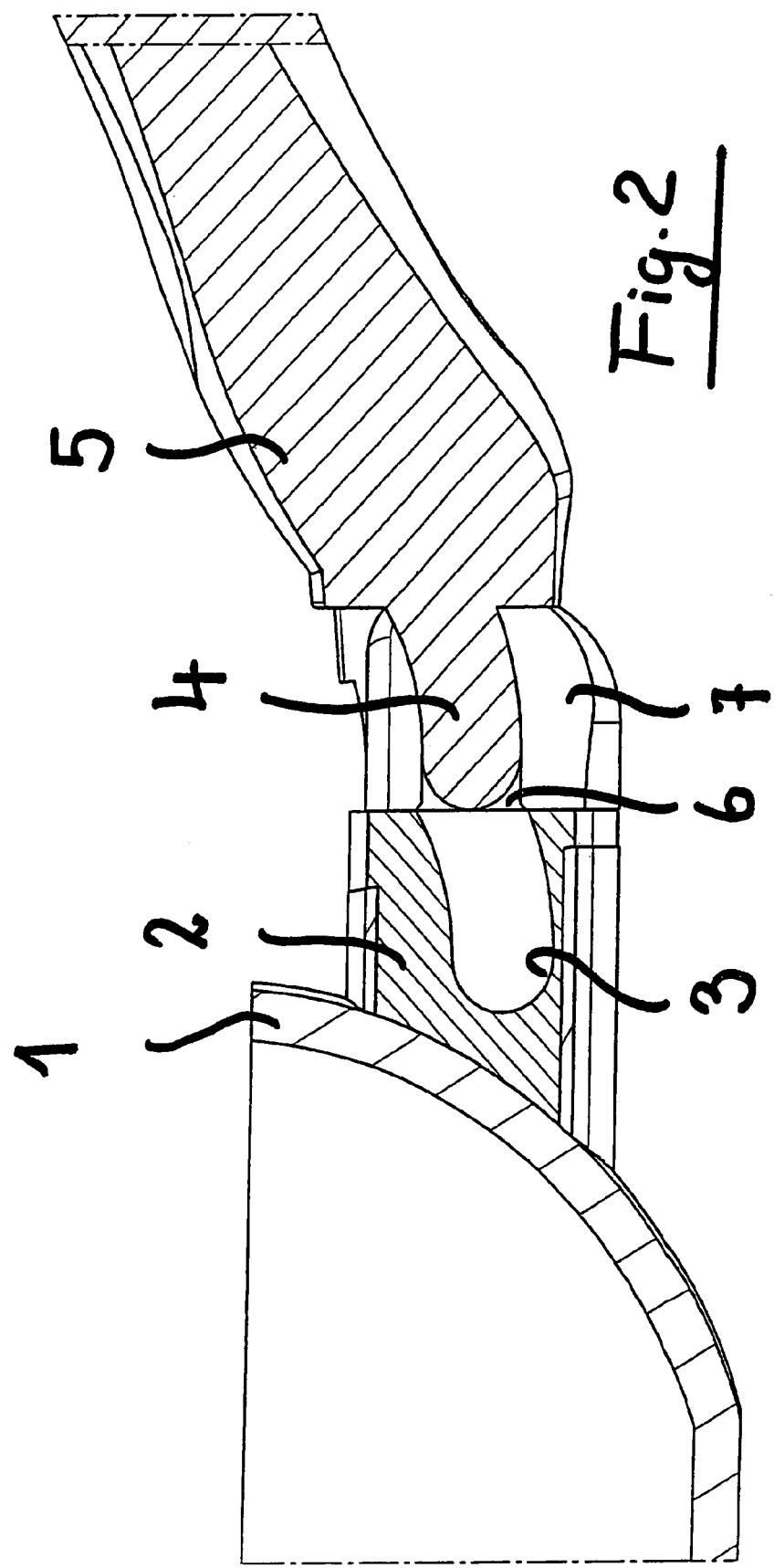
FIG. 2 shows a portion of the pan of FIG. 1, including an end supporting element for a handle, with the handle being partially withdrawn.

FIG. 2 schematically shows a portion of the pan 1 and projecting support 2, a cavity 3 and projection 4 or handle arm 5, exiting a corresponding cavity 3.

Each projection 4 is also guided in an extension 6 of the cavity 3, which extension is formed in a supporting body 7 which can be turned with respect to the support 2 about a horizontal axis X.

Figure 3:
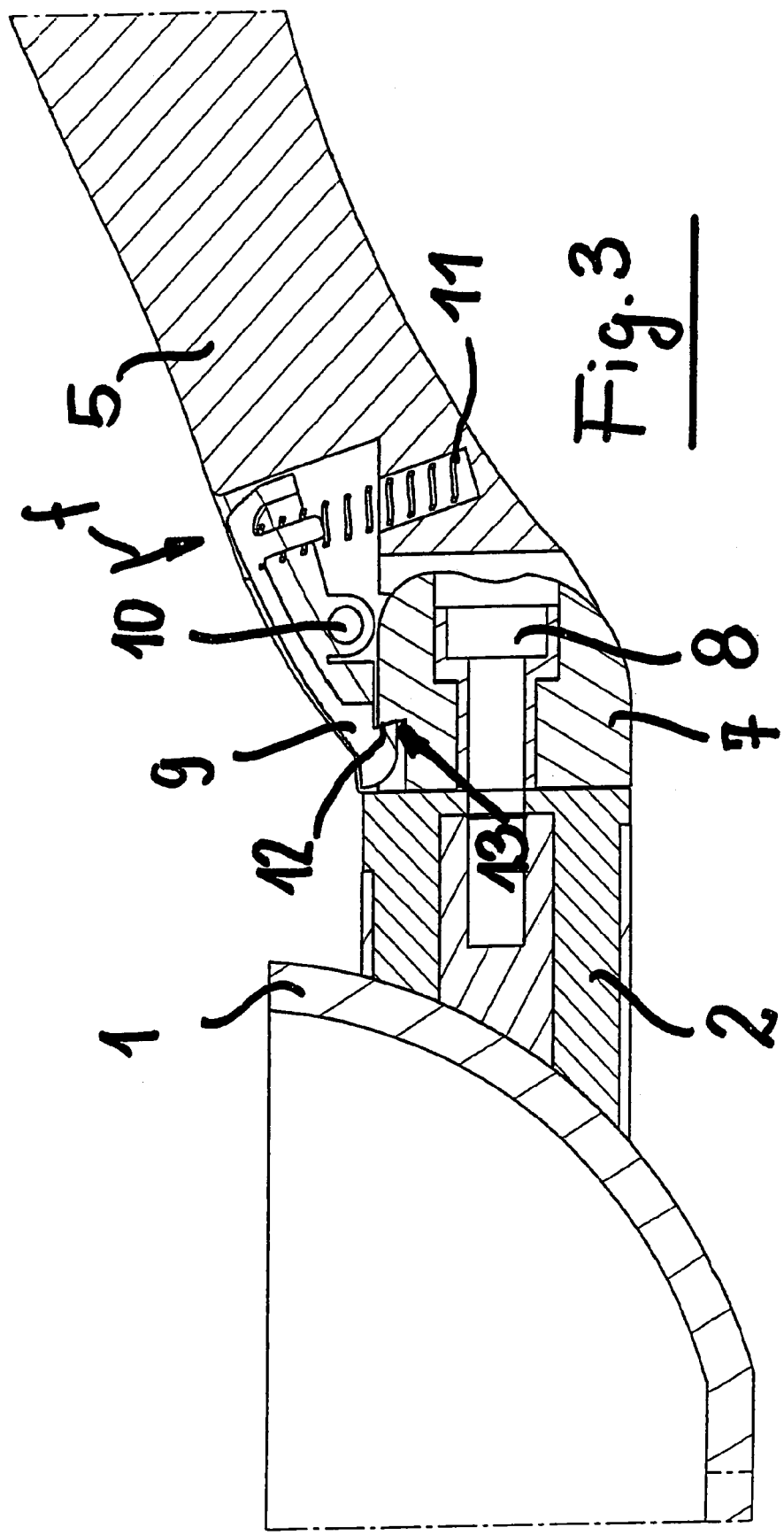
FIG. 3 is a cross-sectional view showing further details of a portion of a cooking pan and a related mechanism for supporting and locking the cooking pan handle.

FIG. 3 shows, in cross section, a portion of the pan 1 with the projecting support 2 and the projection 7, coupled to said support 2 by a coupling screw 8.

FIG. 3 shows moreover, in cross section, a portion of the handle 5 receiving a locking tilting lever 9 which may swing or tilt about a cross pin 10.

Said lever 9 has an end thereof bearing on a spring 11 arranged in a spring recess of the handle 5. At a front side thereof, said lever 9 comprises a detent tooth 12, engaging with an abutment or detent step 13 of the projection 7.

Figure 4:
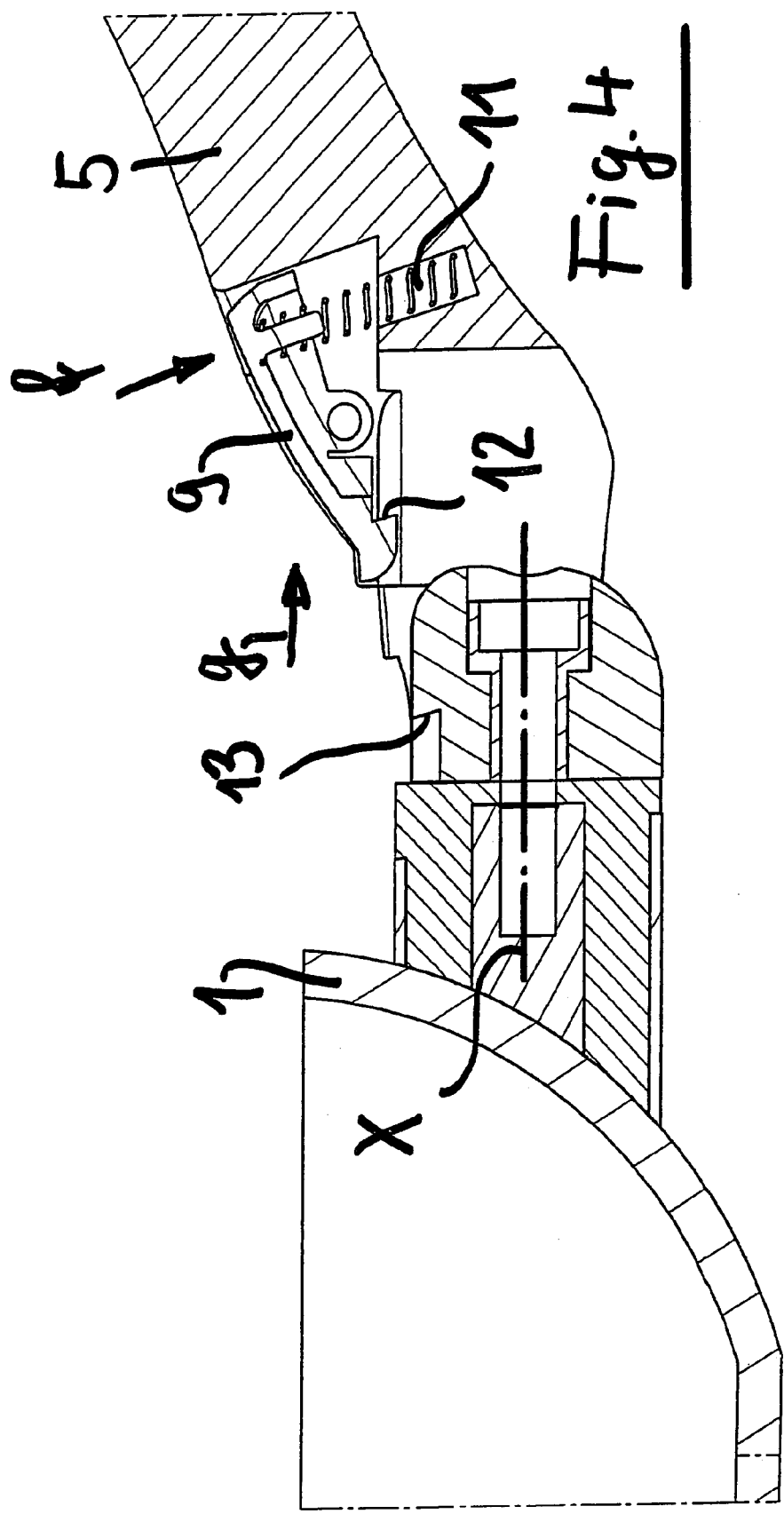
FIG. 4 is a further cross-sectional view showing a portion of a cooking pan, with the mechanism of FIG. 3 being in an unlocked position.

Thus, by operating the locking lever 9 in the direction indicated by the arrow (f), it is possible to press the spring 11 and disengage the handle detent tooth 12 from the detent step 13 of the projection 7, thereby the handle can be outward pulled or withdrawn, as indicated by the arrow (g) in FIG. 4.

Figure 5:
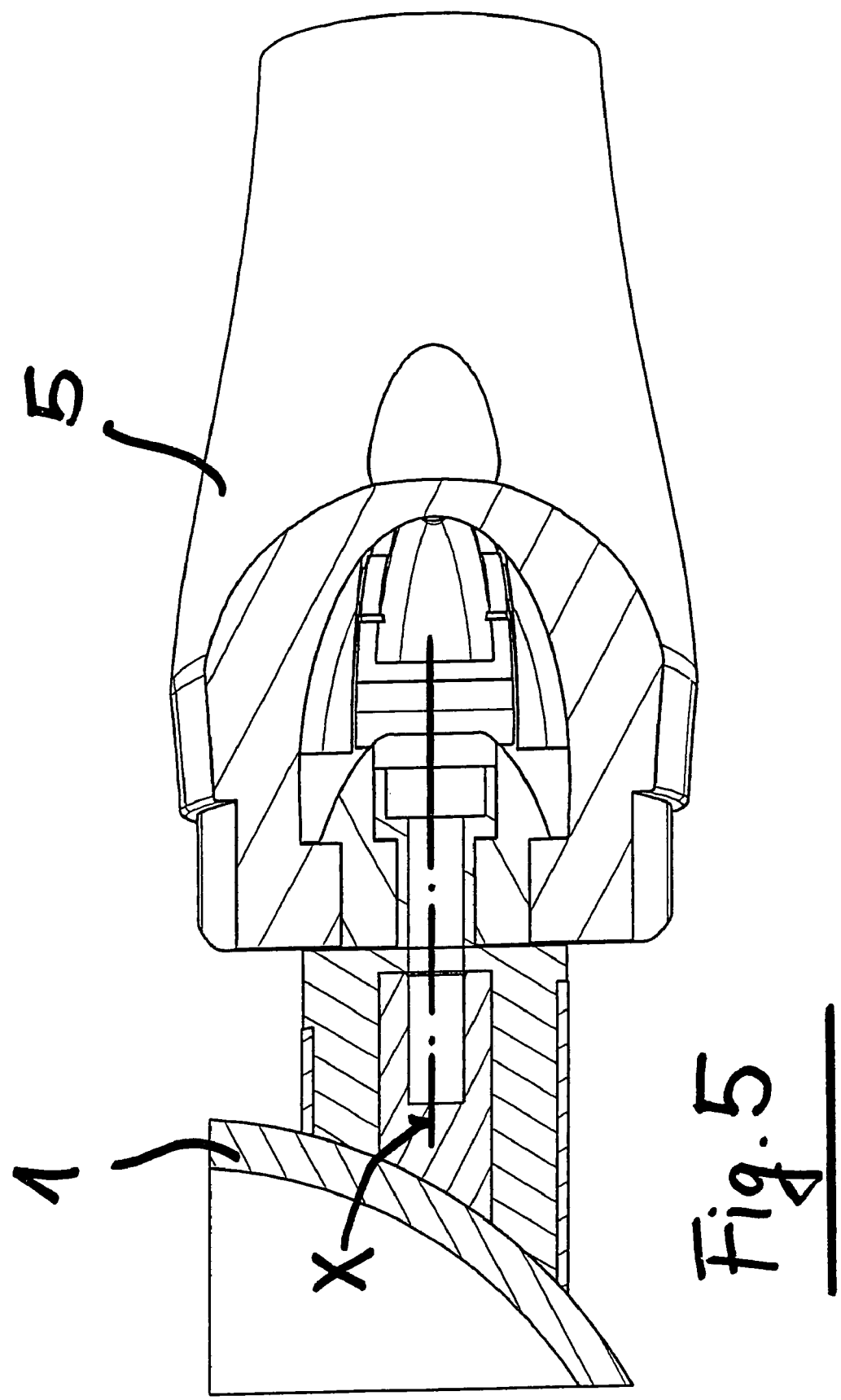
FIG. 5 shows a portion of the cooking pan, the cooking pan handle being arranged in a spaced and partially rotated condition.
Figure 6:
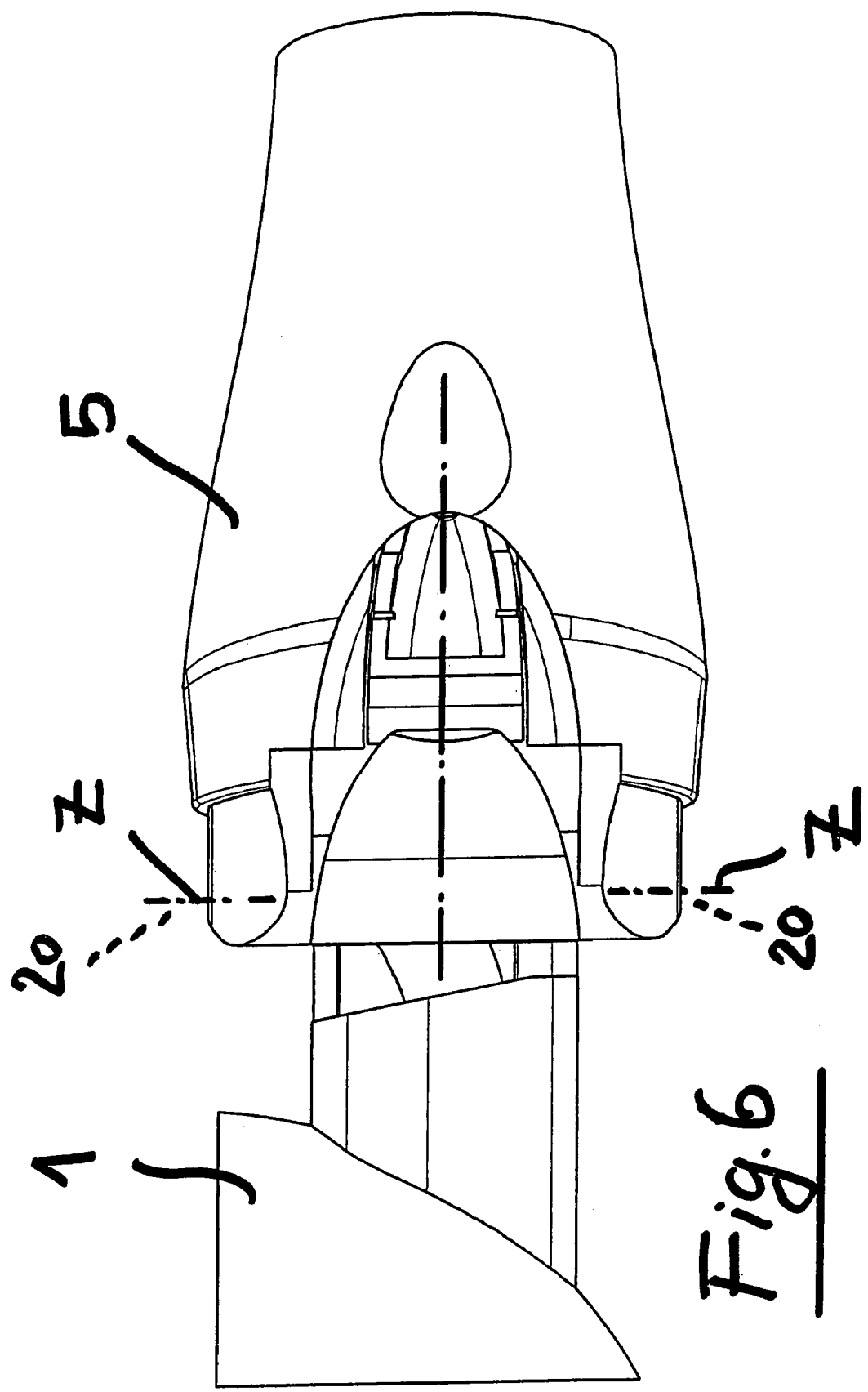
FIG. 6 is a view showing a portion of the cooking pan with the cooking pan handle being detached.

In such a position, the handle 5 may turn about the axis X to be brought to the position shown in FIGS. 5 and 6.

In FIG. 5 said handle 5 has been turned through 90° about said axis X from the position shown in FIGS. 1, 2, 3 and 4.

Figure 7:
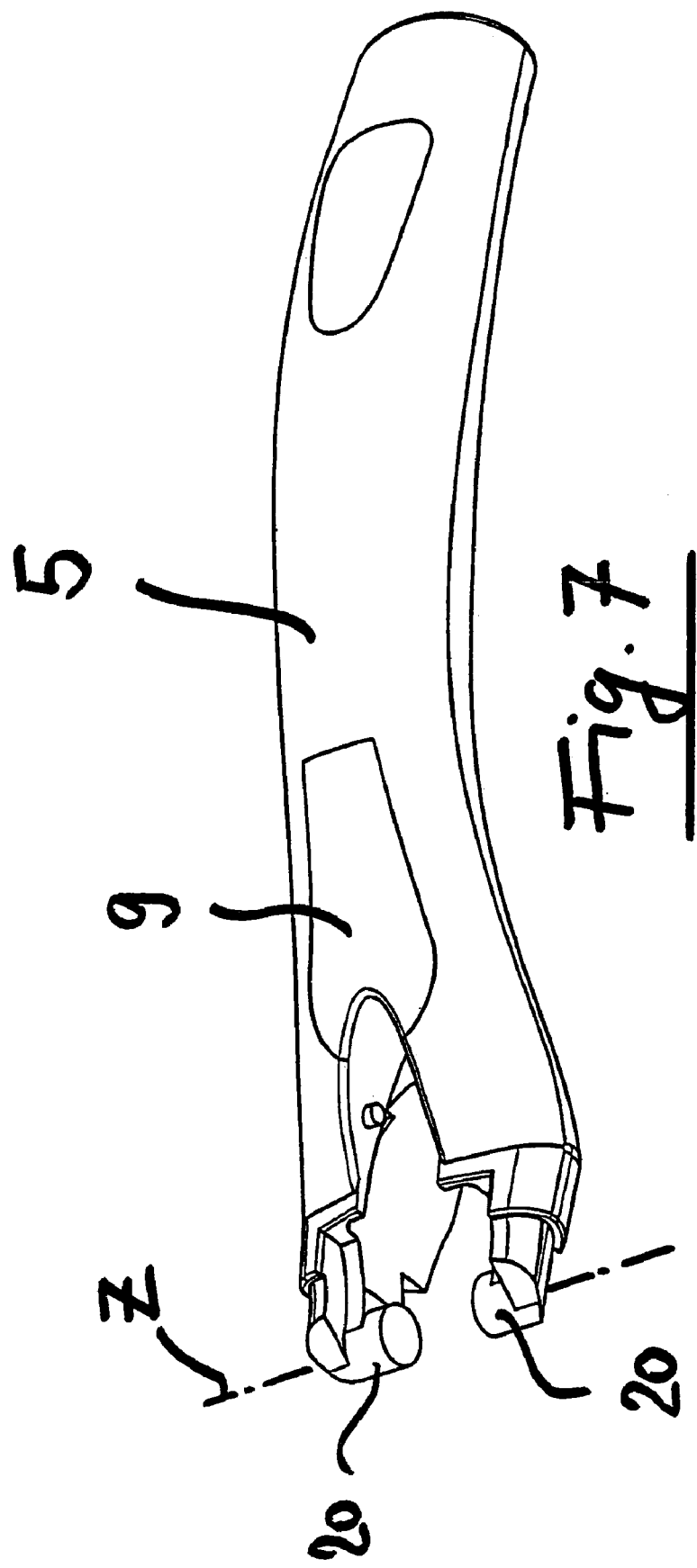
FIG. 7 is a perspective view showing the cooking pan handle.

As shown in further details in FIG. 7, the handle 5 comprises swinging pins 20 for swinging about swinging axes Z.

Figure 8:
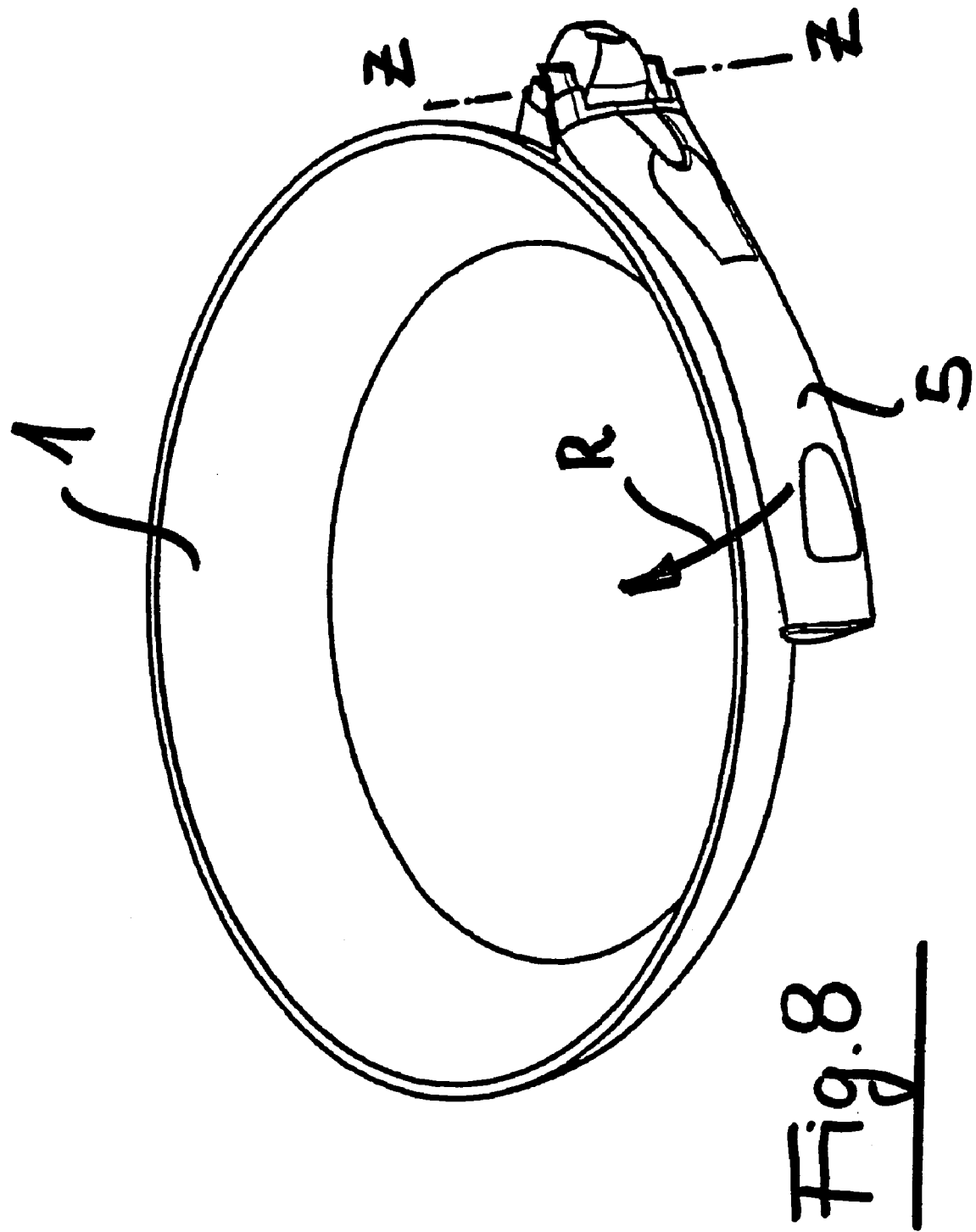
FIG. 8 is a further perspective view showing the cooking pan handle arranged along the perimetrical wall of the pan.

FIG. 7 shows in perspective the handle 5, locking lever 9 and swinging pins 20, arranged in a mutually facing relationship, along a cross axis Z. Accordingly, upon unlocking and turning through 90° (FIGS. 5 and 6), said handle 5 can swing about the axis Z-Z in the direction shown by the arrow R in FIG. 8.

Thus, it is possible to cause the handle to safely and perfectly abut against the circumferential wall of the cooking pan 1.

Accordingly, with the handle 5 being brought to this rest position, the pan 1 will have a minimum radial dimension, and the handle 5 will not radially project from the pan 1.

Advantageously, the handle 5 has an inner curvature approximately corresponding to the outer shape of the pan 1, to perfectly bear or abut against the outer wall of the pan 1.

The latter, in particular, could also have either an oval form or any other similar form.

Figure 9:
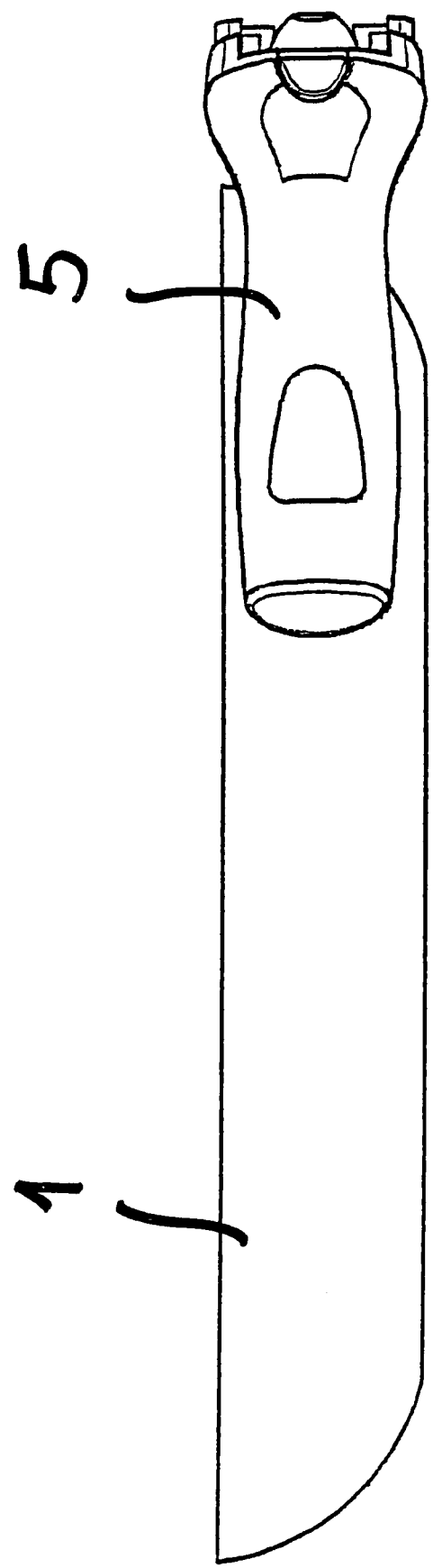
FIG. 9 is a side elevation view showing the cooking pan, the cooking pan handle being folded and arranged along the wall of the pan.

FIG. 9 shows that, with the handle 5 at its rest position, it neither radially projects from the body of the pan 1 nor axially upward projects from the pan body, but fits the perimetrical configuration of the pan.

The invention claimed is:

1. A handle arrangement for a cooking pan having a curved peripheral wall, comprising:
    a support mounted on, and projecting radially outwardly away from, the curved peripheral wall; and
    an elongated handle mounted on the support for pivoting movement about an upright axis between a use position in which the handle extends radially outwardly away from the curved peripheral wall, and a storage position in which the handle curves at least partially along the curved peripheral wall.

2. The handle arrangement of claim 1, and comprising a lock for releasably locking the handle.

3. The handle arrangement of claim 2, wherein the lock includes a lever mounted on the handle for pivoting movement about a horizontal pivot axis between a locked position in which the lever lockingly engages the support in the use position, and an unlocked position in which the lever is disengaged from the support in the storage position.

4. The handle arrangement of claim 3, wherein the support has a shoulder, and wherein the lever has a detent that is urged into locking engagement with the shoulder in the use position.

5. The handle arrangement of claim 1, wherein the support has an extension that extends radially along a radial axis, and wherein the handle is mounted on the extension for turning movement about the radial axis.

6. The handle arrangement of claim 1, wherein the handle has a pair of pins spaced apart of each other and extending along the upright axis in the storage position, and wherein the support has slots for receiving the pins.

7. The handle arrangement of claim 1, wherein the handle has a curved inner surface having a curvature of complementary contour to the curved peripheral wall.

8. The handle arrangement of claim 7, wherein the curved inner surface of the handle abuts, and extends along, the curved peripheral wall in the storage position.

* * * * *